United States Patent [19]
Steiner et al.

[11] 3,795,159
[45] Mar. 5, 1974

[54] INSULATION STRIPPER FOR TWISTING WIRE PAIR

[75] Inventors: Charles Dale Steiner, Harrisburg; Earl William, Annville, both of Pa.

[73] Assignee: AMP Incorporated, Harrisburg, Pa.

[22] Filed: Sept. 20, 1972

[21] Appl. No.: 290,611

[52] U.S. Cl. .................................................. 81/9.51
[51] Int. Cl. .............................................. H02g 1/12
[58] Field of Search ..................................... 81/9.51

[56] References Cited
UNITED STATES PATENTS
3,003,375  10/1961  Hopkins.............................. 81/9.51

OTHER PUBLICATIONS
IBM Technical Disclosure Bulletin, Vol. 3, No. 5, Oct. 1960.

Primary Examiner—James L. Jones, Jr.
Assistant Examiner—Roscoe V. Parker
Attorney, Agent, or Firm—William J. Keating

[57] ABSTRACT

Apparatus for stripping insulation from the end portions of the wires of a twisted pair of wires has insulation stripping blades for cutting into the insulation of the wires. A pair of wire orienting members, mounted adjacent to the stripping blades, engage the twisted pair prior to cutting of the insulation and orient the pair properly with respect to the cutting edges. The stripping blades and the orienting fingers are mounted in a rotatable head which untwists the end portions of the twisted pair.

6 Claims, 6 Drawing Figures

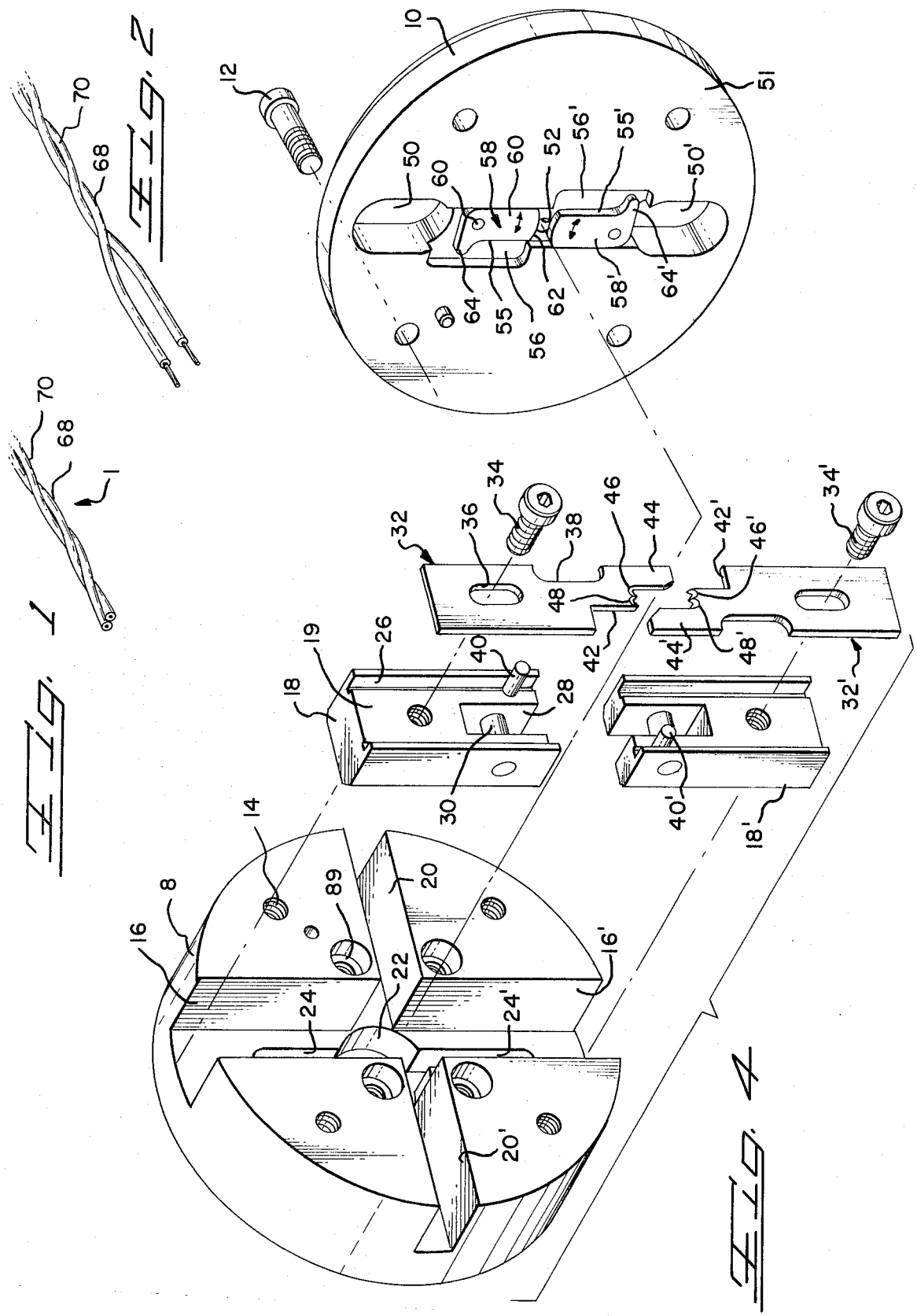

INSULATION STRIPPER FOR TWISTING WIRE PAIR

BACKGROUND OF THE INVENTION

This invention relates to apparatus stripping insulation from the end portions of two associated wires. The specific embodiment of the invention disclosed herein is particularly adapted to strip insulation from the end portions of the wires of a twisted wire pair and untwist or separate these end portions in preparation for further processing such as the application of electrical terminals thereto.

U. S. Pat. application Ser. No. 258,334 filed May 31, 1972, by Earl E. Folkenroth et al. discloses and claims an apparatus for stripping insulation from the wires of a twisted wire pair and concomitantly untwisting or separating the end portions of the wires. This Folkenroth et al. apparatus has a rotatable head in which are mounted a pair of insulation stripping blades which, upon movement towards each other, cut into the insulation of the wires of the pair. The blades are shaped such that they will engage the wires of the pair prior to cutting of the insulation and re-orient the wires so that the wires will be properly positioned in side-by-side relationship when the blades reach their closed positions. Reorientation of the twisted wire pair prior to cutting into the insulation may be necessary if the wires are oriented such that a line connecting their axes extends parallel to the direction of movement of the blades towards each other. If the wires are so oriented, the blades will cut through the wires rather than merely cut into the insulation as explained in the above-identified Folkenroth et al. application.

U. S. Pat. application Ser. No. 258,334 also discloses means for rotating the head in which the stripping blades are mounted so that upon such rotation of the head while the stripping blades are closed, the wires of the pair will be untwisted and separated. The acutal insulation stripping operation is carried out after untwisting by merely pulling the wires axially from between the blades while they are closed. The conducting cores of the wires are, during such pulling, removed from the severed sections of insulation.

The instant invention is specifically directed to the achievement of an improved stripping head having a positive means in the form of wire orienting members for engaging the twisted pair and orienting it properly with respect to the insulation stripping blades. The provision of this wire orienting means permits the use of insulation cutting blades which have edges that conform closely to the cross-section of the wires. The invention thus achieves precise location and orientation of the wires prior to cutting of the insulation and results in improved precision in the insulation cutting operation.

It is accordingly an object of the invention to provide an improved apparatus for stripping insulation from the end portions of a pair of associated wires and simultaneously separating the wires of the pair. A further object is to provide a twisted wire pair insulation stripper having improved means for orienting the twisted pair with respect to the insulation cutting blades. A further object is to provide a twisted pair insulation stripper and untwister having improved insulation cutting blades which are capable of cutting into the insulation of the wires around the entire peripheries thereof without cutting into the metallic cores of the wires. It is a further object to provide an apparatus which can be operated successfully by an untrained operator.

These and other objects of the invention are achieved in a preferred embodiment thereof which is briefly described in the foregoing abstract, which is described in detail below and which is shown in the accompanying drawing in which:

FIG. 1 is a perspective view of the end portion of a twisted pair of insulated wires having insulation extending to the ends of the wires.

FIG. 2 is a perspective view of a twisted pair of wires which have had insulation stripped therefrom and which have been separated or untwisted in accordance with the invention.

FIG. 4 is an exploded perspective view of the untwisting and stripping head.

Figure 3:
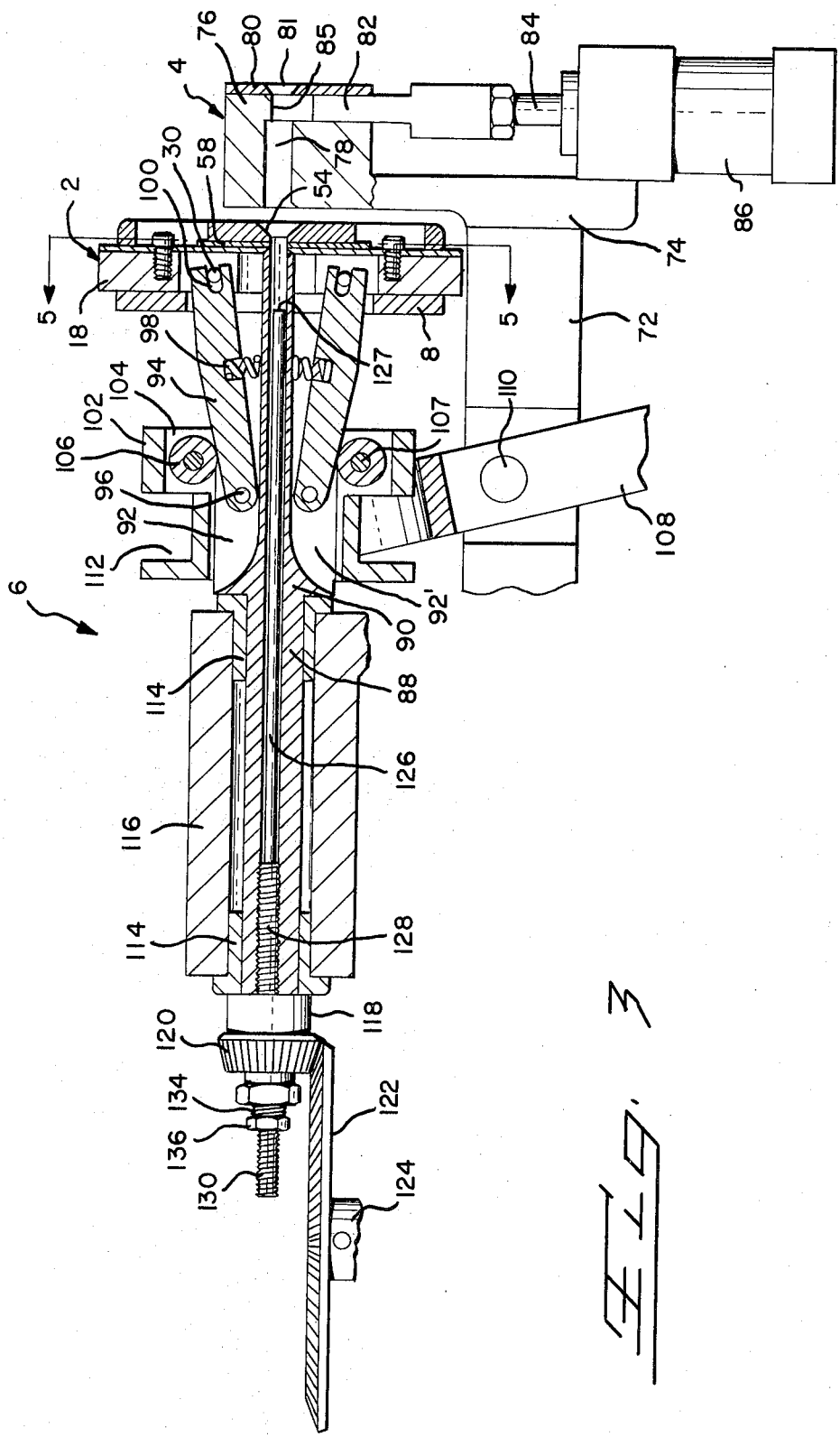
FIG. 3 is a cross-sectional view of an insulation stripping and untwisting apparatus in accordance with the invention.

Referring first to FIG. 1, a twisted wire pair 1 comprises two identical wires 68, 70 which are helically twisted together along their lengths. Twisted wire pairs are widely used in the electrical industry for the reasons that a twisted pair of associated wires is often advantageous from the standpoint of electrical noise abatement and minimization of inductance effects. Furthermore, two wires which are twisted together are easily traced in a complex circuit containing a multitude of additional wires.

If terminals are to be applied to the ends of the wires of a twisted pair, or if the wires are to be soldered to terminal members, it becomes necessary to strip insulation from the end portions of the wires and to separate the two wires as shown in FIG. 2. Most wire strippers which are known to the art are not adapted to the stripping of insulation from the two wires of a pair simultaneously and it is necessary, with these prior art strippers, to manually separate the wires and strip the insulation from their ends individually.

A preferred form of insulation stripping and untwisting apparatus in accordance with the invention (FIG. 3) comprises a stipping and untwisting head 2 a clamping means 4 mounted adjacent to the head for clamping the wires while the stripping and untwisting operations are being carried out, and an actuating means 6 for closing the stripping blades of the head 2 and rotating the head to untwist the wires. The lamping means 4 and the actuating means 6 are of the general type shown in U. S. Pat. application Ser. No. 258,334 and will be described herein only to the extent necessary for an understanding of the present invention. The structure of the stripping head 2 is described in detail below.

Referring now to FIG. 4, the stripping head comprises a cylindrical body portion 8 and a circular face plate 10 which is secured to the body portion by suitable fastening means 12, 14. The body portion has a pair of diametrically opposed slots, 16, 16' extending radially towards its center in which are mounted a pair of blade holding slides 18, 18'. A pair of relatively more narrow slots, 20, 20' are provided which extend at right angles to the slots 16, 16' to permit ejection of removed segments of insulation. The body portion 8 has a centrally located circular opening 22 extending therethrough at the intersection of the slots 16, 16', 20, 20' and has two narrow openings 24, 24' extending radially from the central opening 22 these openings being located in the inner ends of the slots 16, 16'.

The slides 18, 18' are of rectangular cross-sections conforming to the dimensions of the slots 16, 16' and have flanges 26 on their rightwardly facing sides as viewed in FIG. 4. The inner ends of the slides are recessed as shown at 28, 28' and pins 30, 30' extend across these recesses. The acutuating levers which move the slides between their open and closed positions are connected to these pins in a manner described below.

The insulating cutting blades 32, 32' are secured against the faces 19, 19' of the slots by fasteners 34 which extend through openings 36 in the blades, the openings being elongated as shown for purposes of precise adjustment of the blades. The righthand side of the upper blade 32 is recessed as shown at 38 to provide clearance for a camming pin 40 which extends from the face 19 of the slide 18, this camming pin serving to actuate the wire orienting fingers as will also be described below. The lefthand side of the upper blade 32 is recessed as shown at 42 and a depending arm 44 is provided at the lower end of this blade at the righthand side. Two insulation cutting edges 46, 48 are formed on the blade between the upper end of the arm 44 and the lower end of the recess 42, these edges being generally semi-circular as shown and dimensioned to cut into the insulation of the wires 68, 70 of the twisted pair.

The lower blade 32' is complementary, and similar to, the upper blade and has upwardly extending arm 44' which is adapted to enter the recess 42. Lower blade 32' similarly has a recess 42' which is adapted to receive the arm 44 of the upper blade. The edges 46', 48' of the lower blade are in alignment with the edges 46, 48 so that when the blades are closed, the insulation of both wires of the pin will be circumferentially cut along the entire peripheries of the wires.

Face plate 10 has a pair of opposed openings 50, 50' extending therethrough to provide clearance for the heads of the screws 34, 34' when the slides 18, 18' in the body portion 8 are moved towards each other. The leftwardly facing side 51 of the face plate also has relatively shallow recesses 56', 56 which extend from the lower ends of the openings 50, 50' to the center of the plate. An opening 51 extends through the geometric center of the plate to admit the wire pair, this opening being outwardly flared as shown at 54 (FIG. 3) on the righthand side of the plate to provide a guiding surface for the wires.

A wire orienting member 58, is pivotally mounted in the recess 56 by means of a pin 60, this member being in the form of a bell crank having one arm 60 which normally extends towards the center of the plate and a laterally extending arm 64 which projects towards the lefthand side of the recess. The orienting finger 58' in the lower recess 56' has an arm 64' which projects leftwardly in FIG. 4. The side edges 55, 55' of these orienting members are engaged by the camming pins 40, 40' to control the movement of the fingers as will be described below.

As fully described in U. S. Pat. application Ser. No. 258,334, a bench-type apparatus in accordance with the invention has a mounting frame, portions of which are shown at 72, (FIG. 3) on which the actuating means 6 for the stripping head and the clamping means 4 are mounted. The clamping member 4 is mounted on an arm 74 which is integral with the frame 72 and comprises a block 76 having an opening 78 extending therethrough which is in alignment with the opening 52 in the face plate. A plate 80 is advantageously provided on the righthand side of the block 76 and has a funnel-shaped opening 81 to assist the operator in guiding the wire into the head 2. During insulation stripping and wire untwisting, the wire is clamped in the block 76 by a clamping bar 82 which is slidably mounted in a laterally extending recess in block 78. Clamping block 82 is mounted on the end of a piston rod 84 of a pneumatic piston-cylinder 86 which is also secured to the frame arm 74.

Figure 6:
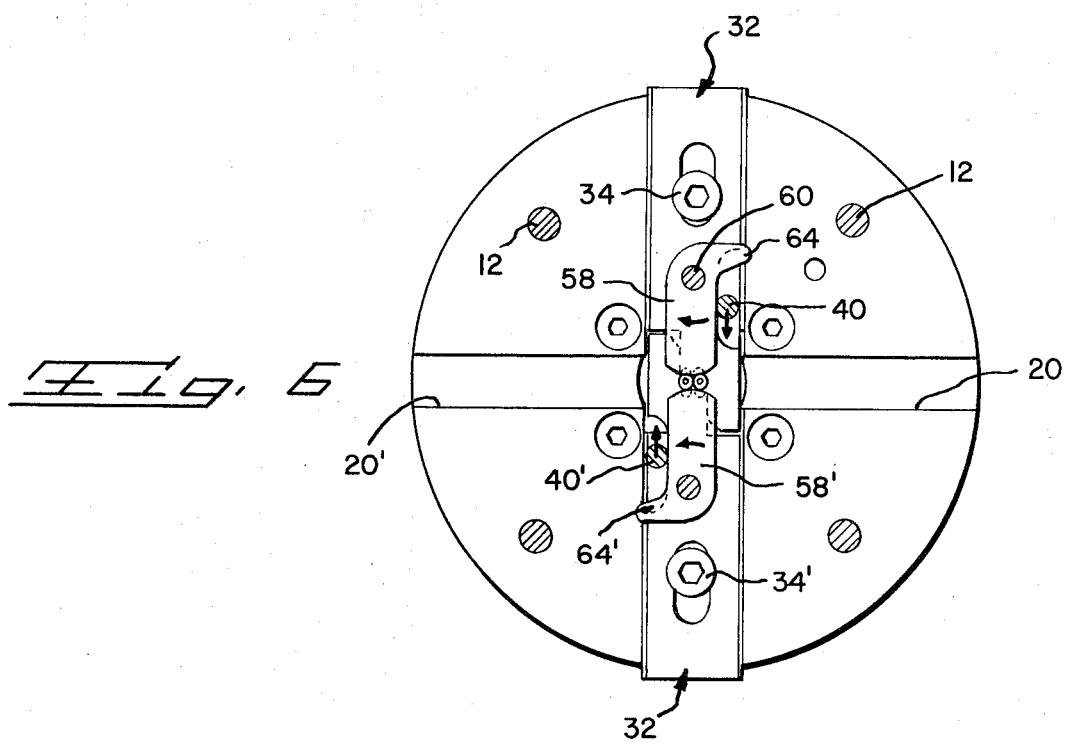
FIG. 6 is a view similar to FIG. 5 but showing the positions of the parts after the wire pair has been oriented by the fingers and the insulation stripping blades have been moved partially towards their closed positions.

The stripping and untwisting head 2 is secured to the righthand end, as viewed in FIG. 3, of a hollow rotatable shaft 88 by means of fasteners (not specifically shown) which extend through holes 89 in the body portion 8 of the head and into the face of the enlarged righthand portion 90 of shaft 88. A pair of diametrically opposite axially extending recesses 92, 92' are formed in the enlarged portion 90 of the shaft 88 and actuating arms 94, 94' are mounted in these recesses by means of pivot pins 96, 96'. The arms 94, 94' have notches 100, 100' on their free ends through which the previously identified pins 30, 30' in the slides 18, 18' extend. Arms 94, 94' are normally biased outwardly with respect to the axis of the shaft by means of springs 98, 98' which are interposed between the undersides of the arms and the surfaces of the recesses 92, 92'. It will be apparent from FIG. 3 that the arms 94, 94' normally maintain the slides 18, 18' in their remote positions relative to each other so that the blades 32, 32' are in their open positions. Upon movement of the arms 94, 94' relatively inwardly towards the axis of the shaft 88, the slides 18, 18' and the blades will be moved radially towards each other to their closed positions (FIG. 6).

Figure 5:
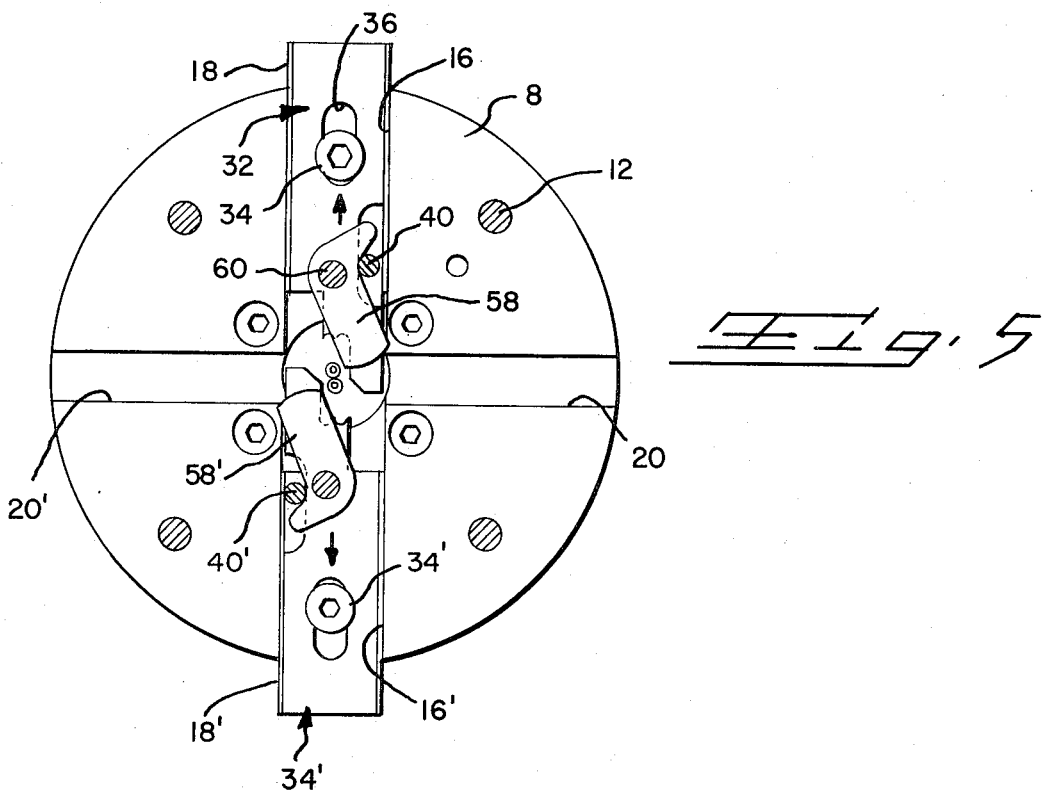
FIG. 5 is a view taken along the lines 5—5 of FIG. 3, this view showing the positions of the insulation stripping blades and the wire orienting members at the beginning of an insulation stripping and untwisting operation.

Pivotal movement of the arms 94, 94' into the recesses 92, 92' to close the blades is accomplished by means of a camming collar 102 which is mounted on the enlarged diameter section 90 of the shaft 88. This collar is keyed to the enlarged diameter portion 90 of the shaft 88 and is slidably mounted on the shaft so that it can move axially along the shaft while the shaft is rotating. This collar has a circumferential internal recess 104 on its righthand sides in which camming rollers 106 are mounted on suitable pin 107. These rollers engage the outwardly facing edges of the arms 94, 94' so that when the collar 102 is moved rightwardly from the position of FIG. 3, the arms will be cammed inwardly towards each other and the slides 18 will be moved radially from the position of FIG. 5 to the positions of FIG. 6.

Camming collar 106 is moved axially along the enlarged diameter portion 90 of the shaft 88 by a lever 108 which is pivoted at 110 to the frame 72. The upper end, as viewed in FIG. 3, of this lever is bifurcated to form two arms, the ends of which are disposed on opposite sides of the collar. Rollers, (not specifically shown) on the ends of these arms are received in an outwardly facing circumferential groove 112 in the collar, the arrangement being such that the shaft 88 and the collar 102 are permitted to rotate as a unit by virtue of the provision of the rollers on the ends of the arms of lever 108. As will be explained below, the collar rotates with the shaft and the head 2 while the wires are being untwisted. Specific details of the rollers on shaft 108 and the manner of keying the collar 102 to the shaft portion 90 are disclosed in the above identified U. S. Pat. application Ser. No. 258,334.

The lefthand portion of the shaft 88 is supported in bearing bushings 114 which in turn are mounted in a bearing support member 116 which is part of the frame 72. The lefthand end of a shaft 88 projects beyond the end of this bearing housing 116 and has a bevel gear 120 having an integral collar 118 on its end. Bevel gear 120 meshes with a larger diameter bevel gear 122 which in turn is fixed to the end of a shaft 124. Rotation of the shaft 124 thus imparts rotation to the bevel gear 120 and therefore to the shaft 88 and the structure mounted on this shaft including the collar 102 and the head 2.

In order to precisely control the amount of insulation removed from the ends of the wires of the twisted pair, a stop rod 126 is adjustably mounted in the hollow center of the shaft 88. The end 127 of this rod is located adjacent to the stripping blades and the precise location of the end of this rod thus determines the amount of insulation removed. Adjustment of the position of this end of the rod is provided for by virtue of the fact that the lefthand end of the rod is externally threaded and the lefthand portion of the hollow interior of the shaft 88 is intentionally threaded. The rod projects leftwardly beyond the end 134 of the shaft and a lock nut 136 is provided to secure the rod in a given position of adjustment. In order to adjust the position of the rod and thereby change the length of insulation removed from the wire end, it is merely necessary to loosen the lock nut 136, rotated at shaft 130 in the desired direction until the desired position of the rod is achieved and tighten the lock nut.

As previously noted, U. S. Pat. application Ser. No. 258,334 discloses structural details of the actuating means for the apparatus such as the means for swinging the lever 108 about its pivotal axis 110 and for imparting the required rotation to the shaft 124 during portions of the operation cycle as described below.

In operation, the twisted pair as shown in FIG. 1 is first inserted through the opening 78 and through the opening 22 and the body member 8 until the ends of the wires are against the end 127 of the rod 126. The piston cylinder 86 is then pressurized to cause the piston rod 84 to move outwardly and clamp the wire pair against the surface 85 of the block 76. The lever 108 is then caused to swing through a clockwise arc about its pivotal axis 110 so that the arms 94 will be swung inwardly towards the axis of the shaft 88. Such inward movement of the arms 94 causes the slide members 18, 18' and the blades 32, 32' mounted on the slide members to move radially inwardly towards each other from the positions of FIG. 5. During this inward movement of the slides, the camming pins 40, 40' will move relatively along the edges 55, 55' of the wire orienting members causing these members to swing through minor acrs. Each member will be swung through a slight clockwise arc as is apparent from FIGS. 5 and 6 but because of the fact that they are mounted on pivotal axes on opposite sides of the wire pair, the arcuate surfaces 62, 62' on the ends of these members will move in opposite directions, the surface 62' moving against the lower wire of the pair and the surface 62 moving against the upper wire of the pair as viewed in FIG. 5. The two wires will thus be reoriented during closure of the strippin blades so that prior to complete closure of the blades, the wires will be in side-by-side relationship with one wire located between the cutting edges 46, 46' and the other wire located between the cutting edges 48, 48'. Upon additional movement of the slides towards each other, these cutting edges will cut into the insulation of both of the wires.

After the insulation has been circumferentially cut and the blades have moved to their fully closed positions, the blades remain closed and the shaft 88 is caused to rotate in the appropriate direction to untwist the portion of the wire pair which extends between the clamping member 82 and the blades. After completion of the untwisted operation, the clamping bar 82 is caused to retract so that the wires are released. The wires are then pulled rightwardly as viewed in FIG. 3 from between the closed insulation cutting blades. The cutting blades restrain the end sections or segments of insulation against movement and the conducting cores of the wires are withdrawn from these end segments. The short portions of the wires which extend from the cutting blades to the end 127 of the rod 126 are not untwisted by the rotation of the shaft 88 however, these end sections are untwisted and separated during pulling of the wires from between the blades so that a stripped and untwisted end on the wire pair is produced as shown in FIG. 2. After the wire pair has been withdrawn from the head, the lever 108 is swung through a counterclockwise arc to return the camming collar to the position of FIG. 3. The short sections of insulation drop into one of the slots 20, 20' and are ejected during a subsequent operating cycle.

A salient advantage of the invention is that the twisted pair is oriented by the orienting means which are separate from the insulation stripping blades so that insulation stripping blades of the type shown having side-by-side semi-circular cutting edges can be used. Cutting edges of this type will cut cleanly through the insulation of the wires around virtually the entire peripheries thereof so that even insulations which are stripped with great difficulty can be removed in accordance with the invention.

Under some circumstances, it may be unnecessary to separate or untwist more than a fraction of an inch of the wire pair. If this is the case, stripping blades and an orienting means can be used without the added feature of a rotatable head. When the blades are closed and the insulation is cut, the end portions of the wires which are stripped of their insulation will become separated while the wires are pulled from between the closed blades.

Changes in construction will occur to those skilled in the art and various apparently different modifications and embodiments may be made without departing from the scope of the invention The matter set forth in the foregoing description and accompanying drawings is offered by way of illustration only.

What is claimed is:

1. A wire stripping device for stripping insulation from the ends of at least two wires, said wires being in side-by-side relationship, said apparatus comprising:

a pair of insulation stripping blades, said blades being movable along predetermined paths between open and closed positions, blade moving means for moving said blades along said paths, said blades having opposed edges which are adjacent to, and spaced from each other when said blades are in said closed positions, a plurality of insulation cutting edge means on each of said opposed edges for cutting into the insulation of wires extending between said edges and transversely of said path, wire orienting means mounted beside each of said blades and on each side of said path, said wire orienting means being movable in opposite directions transversely of the axes of said wires during movement of said blades to said closed position whereby, upon locating said wires between said blades when said blades are in said open position and upon movement of said blades towards each other, said orienting means will move in opposite directions towards and past said wires, and said wires will be oriented between said blades in side-by-side relationship with each wire between a cooperating pair of said cutting edges.

2. A stripping device as set forth in claim 1, said blade moving means comprising opposed slide members, said blades being mounted on said slide members, said wire orienting means being mounted beside said slide members, and camming means on said slide members, said camming means being engageable with said orienting means during movement said slide members towards each other to actuate said orienting means.

3. A stripping device as set forth in claim 2, each of said wire orienting means comprising a bell crank, each of said camming means comprising a pin engageable with edge portions of its associated bell crank.

4. A wire stripping device for stripping insulation from each wire of a twisted pair of wires, said device comprising a pair of opposed insulation stripping blades, said blades being normally spaced apart and being movable along a predetermined path towards and away from each other between open and closed positions, said blades having opposed wire engaging edges and having insulation cutting edges on said opposed edges, said cutting edges being adapted to cut into the insulation of a wire positioned with its axis extending between said blades and transversely of said path, a pair of opposed twisted pair orienting members, said orienting members being adjacent to, and in alignment with, said stripping blades, said orienting members having surface portions which are movable in opposite directions transversely of said wire positioned between said blades, and actuating means responsive to movement of said blades from said open position to said closed position for moving said surface portions in said opposite directions whereby, during movement of said blades to said closed positions, said surface portions of said orienting members engage said twisted pair which is positioned between said blades and orient said pair with the individual wires thereof in side-by-side relationship with respect to said predetermined path so that said insulation cutting edges of said blades will cut into the insulation of both of said wires, and said twisted pair can thereafter be pulled from between said blades to strip insulation from the ends of said wires.

5. A device as set forth in claim 4, said orienting members comprising bell cranks, said actuating means comprising camming pins.

6. Apparatus as set forth in claim 4 including clamping means adjacent to said frame means on one side thereof for clamping said twisted pair.

* * * * *

UNITED STATES PATENT OFFICE
CERTIFICATE OF CORRECTION

Patent No. 3,795,159  Dated March 5, 1974

Inventor(s) Charles Dale Steiner and Earl William Wagner

It is certified that error appears in the above-identified patent and that said Letters Patent are hereby corrected as shown below:

The Title should be

"INSULATION STRIPPER FOR TWISTED WIRE PAIR"

The full names of the two co-inventors should be set forth as follows:

CHARLES DALE STEINER

EARL WILLIAM WAGNER

Signed and sealed this 16th day of July 1974.

(SEAL)
Attest:

McCOY M. GIBSON, JR.
Attesting Officer

C. MARSHALL DANN
Commissioner of Patents